(12) United States Patent
Grzan et al.

(10) Patent No.: US 10,320,209 B2
(45) Date of Patent: Jun. 11, 2019

(54) METHOD AND SYSTEM FOR CONFIGURING ELECTRICAL CONTACTS IN ELECTRICAL DEVICE

(71) Applicant: Philip Morris Products S.A., Neuchatel (CH)

(72) Inventors: Johnny Luke Grzan, Singapore (SG); Kang Liat Keng, Singapore (SG); Raphael Holzherr, Fontaines (CH)

(73) Assignee: Philip Morris Products S.A., Neuchatel (CH)

( * ) Notice: Subject to any disclaimer, the term of this patent is extended or adjusted under 35 U.S.C. 154(b) by 114 days.

(21) Appl. No.: 15/518,079

(22) PCT Filed: Oct. 13, 2015

(86) PCT No.: PCT/EP2015/073702
§ 371 (c)(1),
(2) Date: Apr. 10, 2017

(87) PCT Pub. No.: WO2016/059065
PCT Pub. Date: Apr. 21, 2016

(65) Prior Publication Data
US 2018/0198297 A1    Jul. 12, 2018

(30) Foreign Application Priority Data

Oct. 17, 2014    (EP) .................................... 14189421

(51) Int. Cl.
*H01M 10/44*    (2006.01)
*H01M 10/46*    (2006.01)
(Continued)

(52) U.S. Cl.
CPC .......... *H02J 7/0042* (2013.01); *A24F 47/008* (2013.01); *H01R 29/00* (2013.01); *H02J 7/0054* (2013.01)

(58) Field of Classification Search
CPC ........ H02J 7/0042; H02J 7/355; H02J 7/0013; H02J 7/0031; H02J 9/002
(Continued)

(56) References Cited

U.S. PATENT DOCUMENTS 7,352,567 B2    4/2008  Hotelling et al.
8,535,075 B1    9/2013  Golko et al.
(Continued)

FOREIGN PATENT DOCUMENTS

CN    201595177 U    10/2010
CN    202 112 305 U    1/2012
(Continued)

OTHER PUBLICATIONS

Combined Office Action and Search Report dated Aug. 2, 2018 in Chinese Patent Application No. 201580053361.5 submitting English translation only, 5 pages.
(Continued)

*Primary Examiner* — Edward Tso
(74) *Attorney, Agent, or Firm* — Oblon, McClelland, Maier & Neustadt, L.L.P.

(57) ABSTRACT

A primary device for connecting to a secondary device is provided, including at least three electrical contacts, a voltage source, and a controller, wherein each electrical contact has an associated high switch connected between the contact and the voltage source, and an associated low switch disposed between the contact and electrical ground, and wherein the controller is connected to each of the switches and is configured to sequentially close pairs of switches to connect the voltage source to the device during an orientation operation, each pair of switches comprising a high switch associated with one of the contacts and a low switch associated with another of the contacts, and is further configured to record a voltage difference between the con-
(Continued)

tacts associated with a plurality of pairs of the switches, and to determine an orientation of the secondary device relative to the primary device based on the recorded voltage difference.

15 Claims, 5 Drawing Sheets

(51) Int. Cl.
    *H02J 7/00*    (2006.01)
    *A24F 47/00*   (2006.01)
    *H01R 29/00*   (2006.01)

(58) Field of Classification Search
    USPC .................. 320/107, 114, 115, 117, 137
    See application file for complete search history.

(56) References Cited

U.S. PATENT DOCUMENTS

| | | | |
|---|---|---|---|
| 2006/0110948 A1* | 5/2006 | Gerard | H01R 13/652 439/21 |
| 2013/0115817 A1 | 5/2013 | Terlizzi et al. | |
| 2013/0117470 A1 | 5/2013 | Terlizzi et al. | |
| 2013/0244489 A1 | 9/2013 | Terlizzi et al. | |
| 2014/0009106 A1* | 1/2014 | Andrea | H02H 9/002 320/107 |
| 2014/0181328 A1 | 6/2014 | Terlizzi et al. | |
| 2015/0020832 A1 | 1/2015 | Greim et al. | |

FOREIGN PATENT DOCUMENTS

| | | |
|---|---|---|
| CN | 103094783 A | 5/2013 |
| EP | 2 590 274 A2 | 5/2013 |
| GB | 2491191 A | 11/2012 |
| RU | 2399127 C1 | 9/2010 |
| WO | WO 2009/069969 A2 | 6/2009 |
| WO | WO 2013/015938 A2 | 1/2013 |
| WO | WO 2013/070753 A2 | 5/2013 |
| WO | WO 2013/102611 A2 | 7/2013 |

OTHER PUBLICATIONS

International Preliminary Report on Patentability and Written Opinion dated Apr. 27, 2017 in PCT/EP2015/073702.

International Search Report and Written Opinion dated Jan. 20, 2016 in PCT/EP2015/073702, filed Oct. 13, 2015.

Russian Decision to Grant and Search Report with English translation dated Apr. 3, 2019 in corresponding Russian Patent Application No. 2017112977, citing document AO therein (21 pages).

\* cited by examiner

METHOD AND SYSTEM FOR CONFIGURING ELECTRICAL CONTACTS IN ELECTRICAL DEVICE

The present disclosure relates to a method and system for detecting the orientation of a secondary device electrically connected to a primary device, where the secondary device can connect to the primary device in a plurality of orientations. The invention relates in particular to charging a secondary device from a primary device, and in particular to charging of devices with a plurality of symmetrically disposed electrical contacts that can mate with a charging device in a plurality of different orientations.

Portable electronic devices often need to electrically connect to other electrical devices in order to be recharged and in order to exchange data, such as software updates or usage data. Typically data is transferred over one set of electrical contacts and power is transferred over another set of electrical contacts.

In order to ensure that the correct electrical connections are made, so that the data contacts on one device mate with the data contacts on the other device, and similarly the power contacts on one device mate with the power contacts on the other device, prior systems have relied on mechanical means to ensure that only a correct connection can be made. This means that the device housings or sockets on the housings must be made asymmetrical.

However, asymmetrical housings may be technically and aesthetically undesirable. It is an object of the invention to allow power and data contacts on two devices to be correctly mated together without requiring mechanical means to force the two devices into one particular orientation relative to one other.

In a first aspect there is provided a primary device for connecting to a secondary device, the primary device comprising at least three electrical contacts,
 a voltage source; and
 a controller,
wherein each electrical contact in the primary device has an associated high switch connected between the contact and the voltage source, and an associated low switch positioned between the contact and electrical ground,
wherein the controller is connected to each of the switches and is configured, during an orientation operation, to sequentially close pairs of switches to connect the voltage source to the device, each pair of switches comprising a high switch associated with one of the contacts and a low switch associated with another of the contacts, and is configured to record a voltage difference between the contacts associated with a plurality of pairs of the switches, and determine an orientation of the secondary device relative to the primary device from the recorded voltage differences.

The secondary device may have a plurality of electrical contacts associated with different functions and the electrical contacts of the secondary device can engage the electrical contacts of the primary device in a plurality of orientations.

The controller may be configured to close a plurality of the switches in response to the determined orientation of the secondary device. In this way the functions of the electrical contacts in the primary device can be configured to match the function of the electrical contacts of the secondary device depending on the orientation of the secondary device.

The primary and secondary devices can therefore be coupled together in a plurality of different relative orientations and there is no need for any mechanical keying of the two devices to force a particular relative orientation. The device housings can be made rotationally symmetrical, which may be beneficial for technical or aesthetic reasons. Devices that can be coupled together in several different orientations are also typically easier to use than devices that can only be coupled together in one or a more limited number of orientations. The plurality or orientations is preferably a finite number of orientations.

By using the voltage source in the primary device and measuring the voltage drop across the plurality of pairs of contacts to determine the relative orientation of the primary and secondary devices, no power is required from within the secondary device. So the system can operate even if the secondary device has no available power, for example because a battery in the secondary device has become fully discharged.

The primary device may be an electrical charging device and the controller may be configured to close a plurality of the switches in response to the determined orientation of the secondary device prior to a charging operation.

Any suitable switches may be used, but in one embodiment each of the switches is a transistor.

The primary device may comprise a non-volatile memory, which stores a record of expected voltage differences between the contacts associated with each of the plurality of pairs of switches for each of the plurality of orientations, and the controller may be configured to compare voltage differences recorded during the orientation operation with the expected voltage differences to determine an orientation of the secondary device.

The primary device may further comprise a current limiting resistor connected in parallel with a current limiting switch between the voltage source and the electrical contacts on the device, wherein the controller is configured to hold the current limiting switch open during the orientation operation. This ensures that only limited current is passed to the secondary device contacts during the orientation operation but that a greater current can be passed to the secondary device during a charging operation.

The primary device may comprise at least five electrical contacts. In one embodiment the primary device comprises five electrical contacts within a socket. The socket has a regular decagonal cross-section. Each of the five electrical contacts is equally spaced around a central point in a rotationally symmetric pattern. Each of the contacts may span two adjacent sides of the socket.

In a second aspect of the invention, there is provided an electrical system comprising a primary device and a secondary device, the primary device comprising at least three electrical contacts, the secondary device having a plurality of electrical contacts associated with different functions and wherein the electrical contacts on the secondary device can engage the electrical contacts of the primary device in a plurality of orientations, the primary device comprising:
 a voltage source; and
 a controller,
wherein each electrical contact in the primary device has an associated high switch connected between the contact and the voltage source and an associated low switch positioned between the contact and electrical ground,
wherein the controller is connected to each of the switches and is configured, during an orientation operation, to sequentially close pairs of switches to connect the voltage source to the secondary device, each pair of switches comprising a high switch associated with one of the contacts and a low switch associated with another of the contacts, and is configured to record a voltage difference between the contacts associated with a plurality of pairs of switches, and determine an orientation of the secondary device relative to the primary device from the recorded voltage differences.

The plurality of orientations is preferably a finite number of orientations.

Advantageously, the secondary device comprises protection diodes connected between a plurality of the pairs of contacts on the secondary device.

The primary device and the secondary device may each have at least four contacts. Two contacts on the secondary device may be data contacts, one contact may be a high side power supply contact and another contact may be a low side power supply contact or electrical ground contact.

The secondary device may comprise a secondary battery.

The secondary device may be shaped to fit within a socket in the primary device in a plurality but finite number of orientations so that the electrical contacts on the secondary device can engage the electrical contacts of the primary device in a plurality but finite number of orientations. The secondary device may have a housing with a regular polygonal cross-section. The primary device may have a socket with a corresponding regular polygonal cross section. For example, the secondary device and socket may have a square, pentagonal, hexagonal, octagonal or decagonal cross section.

The secondary device may have a housing with a greater number of sides than it has electrical contacts. For example, the secondary device may have a housing with twice as many sides as it has electrical contacts. In one example, the secondary device has a housing with a decagonal cross section and has five electrical contacts.

The electrical contacts on the secondary device may be disposed in a rotationally symmetrical pattern. The electrical contacts on the primary device may also be disposed in a rotationally symmetrical pattern. The electrical contacts on the secondary device may be equally angularly spaced around a central point on an end surface of the secondary device. Alternatively, the secondary device may comprise one central contact on an end surface of the device and a plurality of further electrical contacts symmetrically disposed around the central contact.

The electrical contacts on the secondary device may extend over two or more sides of the device. If the secondary device can be oriented relative to the primary device in the same number of orientations as there are sides on the secondary device, this means that each electrical contact on the primary device can have two or more positions in which it can engage with any given contact on the secondary device. So there may be more mechanically distinct orientations than there are electrically distinct orientations. For example, if the secondary device has a housing with ten sides and can be oriented in ten different physical orientations relative to the primary device, but has only five electrical contacts each extending across two sides of the housing of the secondary device, then each of those positions may be electrically equivalent to one other position.

The secondary device may be an electrically operated smoking device and may be sized to approximate the size of a conventional cigarette.

The primary device may be a charger device or an adaptor allowing the secondary device to connect to a further device and exchange power and data with the further device. For example, the primary device may be a USB adaptor for the secondary device.

In a third aspect of the invention there is provided a method of detecting the orientation of a secondary device relative to a primary device to which the secondary device is connected, the primary device comprising at least three electrical contacts, the secondary device having a plurality of electrical contacts associated with different functions of the secondary device and wherein the electrical contacts on the secondary device can engage the electrical contacts of the primary device in a plurality of orientations, the primary device comprising a voltage source and a controller, wherein each electrical contact in the primary device has an associated high switch connected between the contact and the voltage source and an associated low switch positioned between the contact and electrical ground, the method comprising:

sequentially closing pairs of the switches to connect the voltage source to the secondary device, each pair of switches comprising a high switch associated with one of the contacts and a low switch associated with another of the contacts, recording a voltage difference between the contacts associated with a plurality of pairs of switches, and determining an orientation of the secondary device relative to the primary device from the recorded voltage differences.

The primary device may comprise a non-volatile memory storing a record of expected voltage differences between the contacts associated with each of the plurality of pairs of switches for each of the plurality of orientations, and the method may comprise: comparing voltage differences recorded during an orientation operation with the expected voltage differences to determine an orientation of the device.

However, not all pairs of switches may have an expected voltage difference stored for them. The expected voltage difference between the contacts associated with a first pair of switches may be variable depending on a condition of the secondary device.

In a fourth aspect of the invention, there is provided a method of charging a secondary device connected to a primary device, the primary device comprising at least three electrical contacts, the secondary device having a plurality of electrical contacts associated with different functions of the secondary device and wherein the electrical contacts on the secondary device can engage the electrical contacts of the primary device in a plurality of orientations, the primary device comprising a voltage source and a controller, wherein each electrical contact in the primary device has an associated high switch connected between the contact and the voltage source and an associated low switch positioned between the contact and electrical ground, the method comprising:

determining the orientation of the secondary device relative to the primary device in accordance with the method of the third aspect, closing a plurality of the switches in response to the determined orientation of the device, and providing a charging current from the primary device to the secondary device through at least one of the closed switches.

Any feature relating to one aspect may be applied to other aspects, in any appropriate combination. In particular, method aspects may be applied to apparatus aspects, and vice versa. Furthermore, any, some or all features in one aspect can be applied to any, some or all features in any other aspect, in any appropriate combination.

It should also be appreciated that particular combinations of the various features described and defined in any aspects of the invention can be implemented or supplied or used independently.

These and other aspects of the apparatus will become apparent from the following exemplary embodiments that are described with reference to the following figures in which:

FIG. 3b is an illustration of the layout of the electrical contacts on the primary device of FIGS. 1A and 1B overlaid on the illustration of FIG. 3a;

Figure 1:
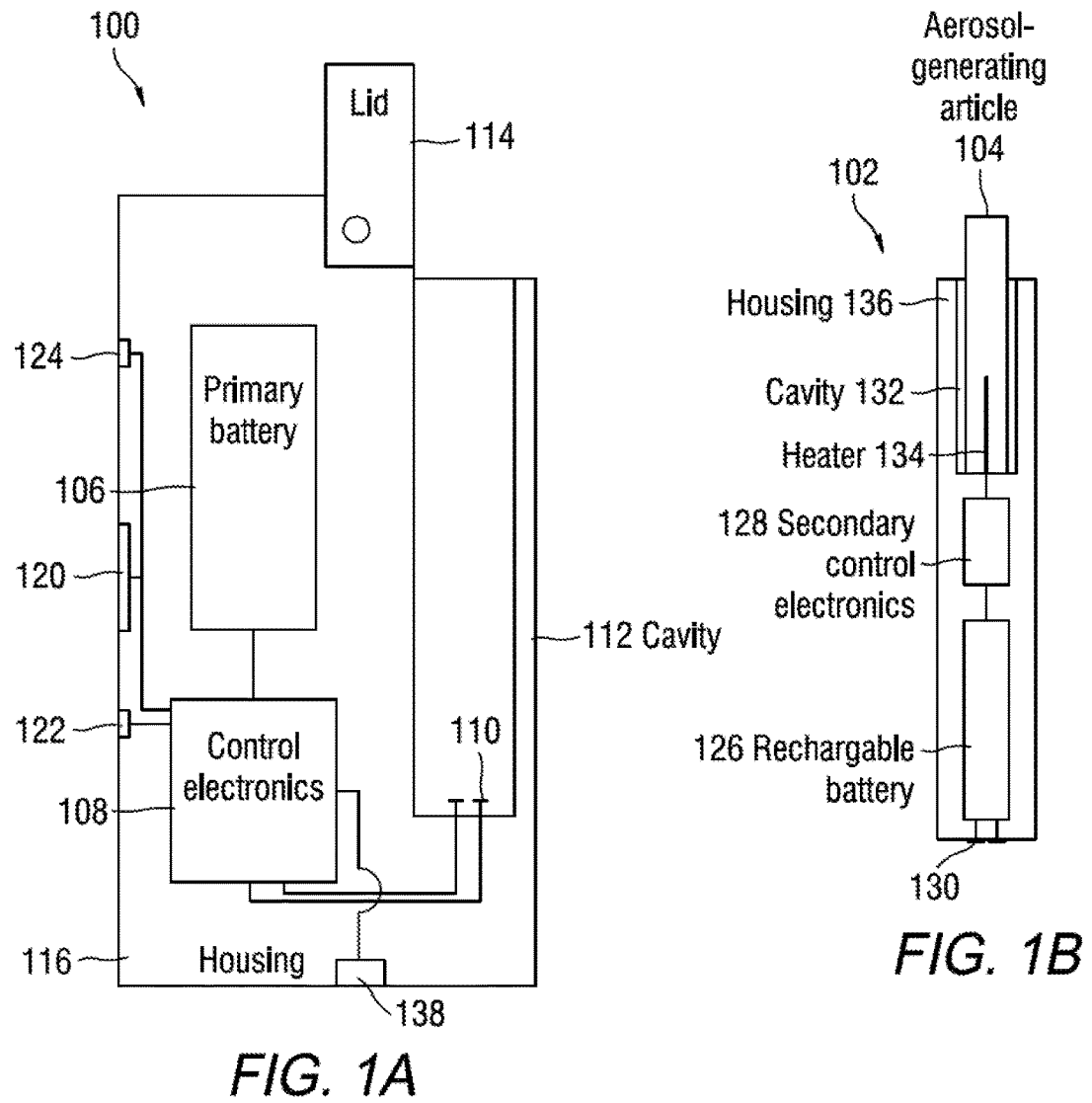
FIGS. 1A and 1B are schematic illustrations of components of a system comprising a primary device that is configured to charge a secondary device.

FIG. 1A shows a primary device 100. The primary device 100 in this example is a charging and cleaning unit for an electrically heated smoking system. FIG. 1B also shows a secondary device 102. The secondary device 102 in this example is an electrically heated aerosol-generating device adapted to receive a smoking article 104 comprising an aerosol-forming substrate. The primary device 100 comprises a primary battery 106, control electronics 108, and electrical contacts 110 configured to provide electrical power to the secondary device, from the battery 106, when the secondary device is in connection with the electrical contacts 110. The primary device is configured to charge the secondary device utilising the battery 106. The electrical contacts 110 are provided adjacent the bottom of a cavity 112. The cavity is configured to receive the secondary device 102. A lid 114 is provided that is configured to secure the secondary device 102 within the cavity 112 of the primary device 100. The components of the primary device 100 are housed within the housing 116. The lid 114 is coupled to the housing 116 by hinge 118.

In addition, the primary device 100 is provided with a series of three indicators 120, 122 and 124. The indicator 120 is provided to indicate the percentage level of charge remaining in the primary battery 106. For example, 100% would indicate that the battery 106 is fully charged, and 50% would indicate that the battery 106 is half charged.

The second indicator 122 is provided to indicate that the secondary device 102 is fully charged, and ready to be used to generate an aerosol. The indicator 122 only indicates this state of readiness once the secondary device is capable of providing sufficient power to provide the user with a complete smoking experience; for example, sufficient power to aerosolise the entire aerosol forming substrate 104, or sufficient power to generate a predetermined number of puffs. In this specific embodiment, the secondary device 102 cannot be operated unless the rechargeable battery 126 is fully charged. The third indicator 124 is provided to indicate that the secondary device is being cleaned.

The secondary device 102 comprises a rechargeable battery 126, secondary control electronics 128 and electrical contacts 130. As described above, the rechargeable battery 126 of the secondary device 102 is configured to receive a supply of power from the primary battery 106 when the electrical contacts 130 are in contact with the electrical contacts 110 of the primary device 100 and the lid is in the closed position. The secondary device 102 further comprises a cavity 132 configured to receive the aerosol generating article 104. A heater 134, in the form of, for example, a blade heater, is provided at the bottom of the cavity 132. In use, the user activates the secondary device 102, and power is provided from the battery 126 via the control electronics 128 to the heater 134. The heater is heated to a standard operational temperature that is sufficient to generate an aerosol from the aerosol-forming substrate of the aerosol-generating article 104. The components of the secondary device 102 are housed within the housing 136.

The primary device is provided with five electrical contact pins 110, two to supply power to the secondary device as described, and two to communicate data between the primary device and the secondary device, and one redundant contact. The data connections are used to download data from the secondary device such as usage statistics, operational status information and the like. In addition, the data connection is configured to upload data from the primary device to the secondary device such as operating protocols and software updates. The operating protocols may include power supply profiles to be used when supplying power from the secondary power supply to the heater. Data may be communicated from the secondary device 102 to the primary device 100 and stored in, for example, control electronics 108. Data may then be communicated out of primary device 100 via communication port 138 which may be connected to control electronics 108.

Figure 2:
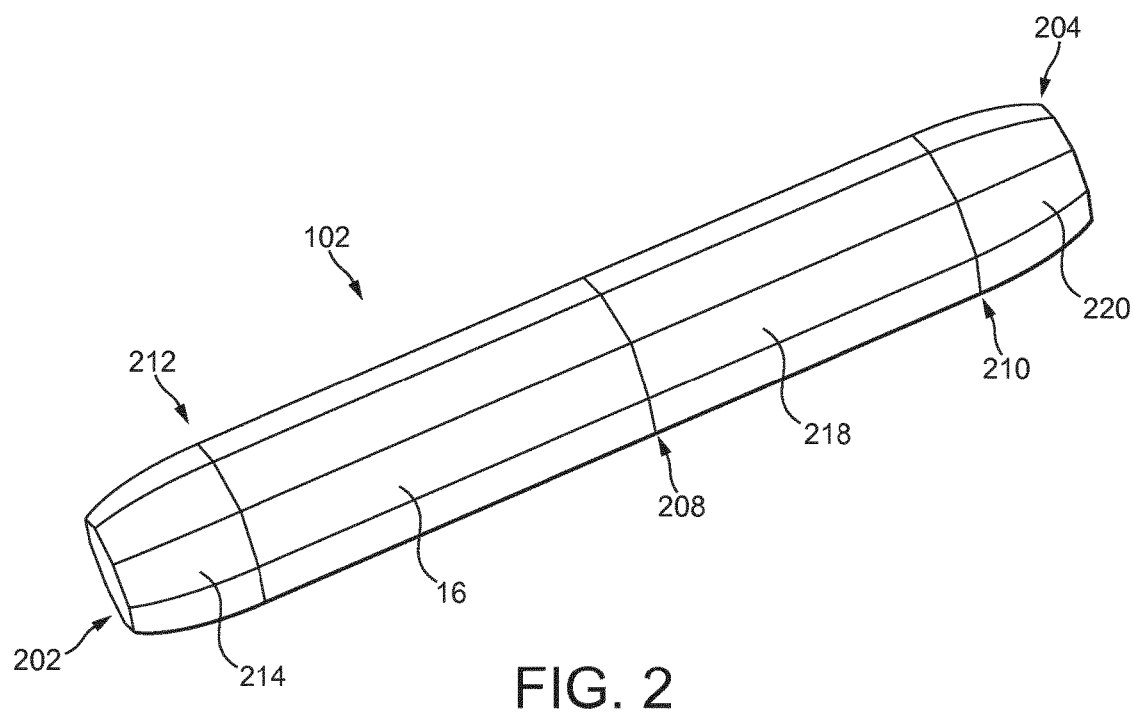
FIG. 2 is a perspective illustration of an exemplary secondary device.

FIG. 2 shows a perspective view of one embodiment of a secondary device 102. The device 102 is elongate and comprises two opposed polygonal end faces 202 and 204 respectively. As can be seen, the outer housing of the device 102 comprises four portions joined at the coupling lines 208, 210 and 212 respectively. The four portions respectively are a first tapered end portion 214 attached to a first central portion 216, a second tapered end portion 220 attached to a second central portion 218.

The secondary device 102 has a regular polygonal cross-section along its length. The cavity 112 in the primary device forms a socket for the secondary device and has cross-section along its length of a corresponding polygon, in this example a regular decagon. This means that the secondary device can be received in the socket of the primary device in ten different orientations, as will be described.

Figure 3A:
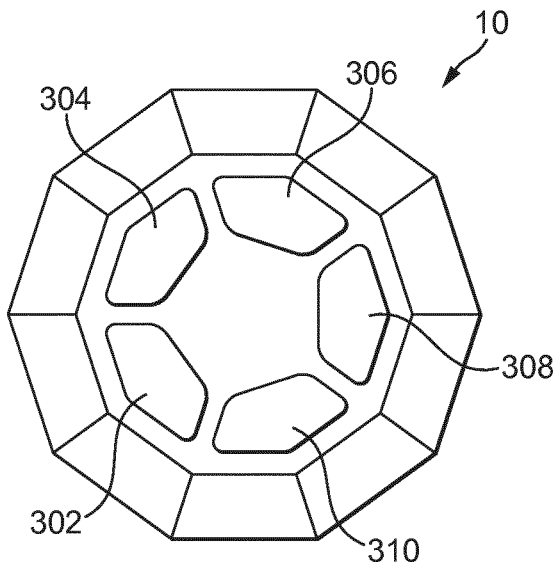
FIG. 3a is an illustration of the layout of the electrical contacts on an end face of the secondary device of FIG. 2.

FIG. 3a shows the polygonal end faces 202 of the secondary device 200. As can be seen, the polygon in this embodiment has ten sides. FIG. 3 shows the end face 202 which has five electrical contacts 300. There are five electrical contacts 302, 304, 306, 308 and 310, each spanning two adjacent sides of the decagonal housing. The electrical contacts are disposed in a rotationally symmetric pattern about a central axis of the secondary device. The electrical connections are adapted to connect with the contact pins 110 in the primary charging device 100. Contact 302 is the power input contact, contact 304 is an electrical ground contact, contact 306 is a data receiving contact, contact 308 is a redundant contact, which is also connected to electrical ground and contact 310 is a data transmission contact.

Figure 3B:
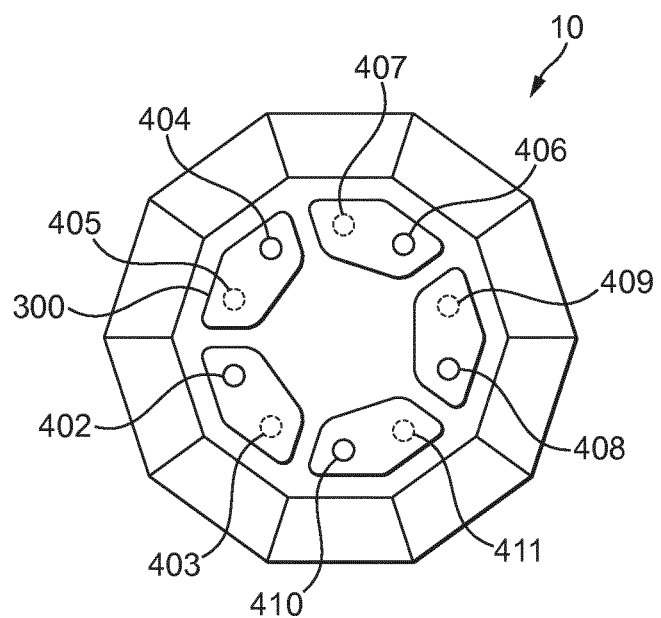

FIG. 3(b) shows the end face of the secondary device with the position of the electrical contact pins of the primary device superimposed. There are five pins corresponding to the five electrical contacts on the secondary device. It can be seen that each of the pins is in contact with a different electrical contact on the secondary device. FIG. 3(b) also shows in dotted outline another possible position for the pins on the contacts of the secondary device, rotated 36 degrees relative to the position of the pins shown in solid outline. The two positions illustrated are mechanically different but electrically identical.

The primary device comprises a plurality of switches that allow each of the five pins to be connected to the power output from the charging system, to electrical ground, and to the data reception and data transmission ports of the CPU in the primary device, depending on the orientation of the secondary device in the primary device. In this way the end user can insert the secondary device into the socket in the primary device in any mechanically possible orientation without needing to worry about the correct electrical configuration.

In order to configure the pins in the primary device correctly, the primary device must first be able to determine the orientation of the secondary device. In this example, because the primary device is a charger, it is possible that the secondary device will have no power. So the detection process uses a power source in the primary device to perform the orientation detection process.

TABLE 1

| Transistors turned ON | 412 + 422 | 414 + 424 | 416 + 426 | 418 + 428 | 420 + 430 |
|---|---|---|---|---|---|
| Pin connected to Vcc | 402 | 404 | 406 | 408 | 410 |
| Pin connected to Gnd | 404 | 406 | 408 | 410 | 402 |
| Transistor stage reference | Stage 1 | Stage 2 | Stage 3 | Stage 4 | Stage 5 |

The CPU 432 records the voltage difference between the pin connected to Vcc and the pin connected to ground.

The voltage response of the contacts on the secondary device is shown in Table 2 below.

TABLE 2

| Position reference | Position 1 | Position 2 | Position 3 | Position 4 | Position 4 |
|---|---|---|---|---|---|
| Pin connected to Vcc | Vcc | Gnd | Tx | NC | Rx |
| Pin connected to Gnd | Gnd | Tx | NC | Rx | Vcc |
| Analog behavior | Battery voltage [0 V-4.2 V] | Protection diode forward voltage [max 0.8 V] | Protection diode backward => no current => Vcc | Protection diode forward voltage [max 0.8 V] | Protection diode backward => no current => Vcc |
| Digital interpretation | Undefined Ø | Low level 0 | High level 1 | Low level 0 | High level 1 |

Figure 4:
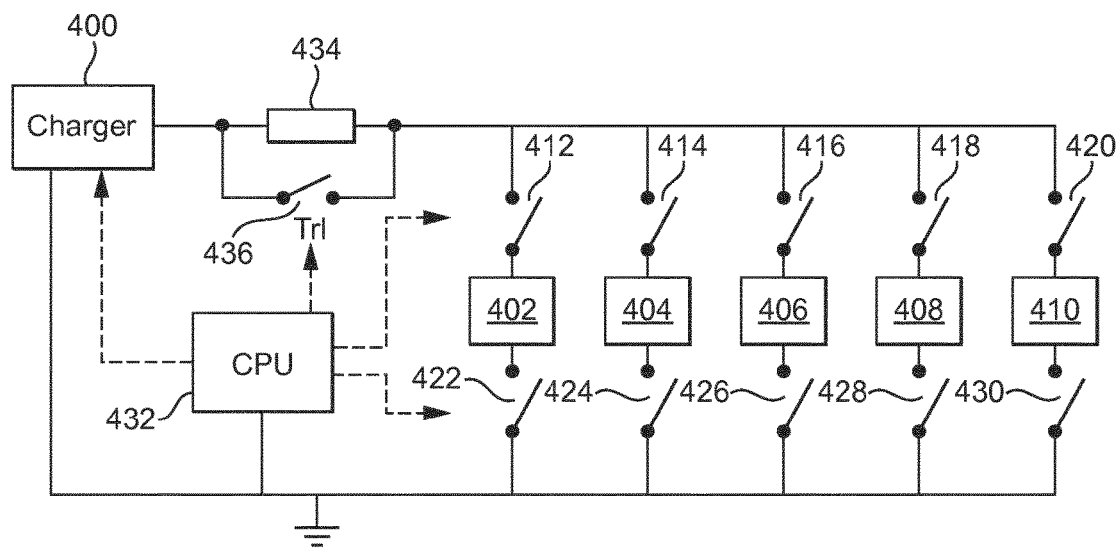
FIG. 4 is a schematic illustration of the orientation detection and charging system of the primary device of FIGS. 1A and 1B.

FIG. 4 is a simplified diagram showing the arrangement of switches in the primary device that allows the connection of each the pins to the charging voltage from the battery in the primary device and to electrical ground.

The pins 402, 404, 406, 408 and 410 each have an associated high side switch 412, 414, 416, 418 and 410, and an associated low side switch 422, 424, 426, 428 and 430, respectively. The switches can be used to selectively connect each of the pins to the charging voltage from the charger 400 and to electrical ground. In this example each of the switches is a transistor, and operation of each switch is controlled by CPU 432. A current limiting resistor 434 is also provided to ensure that only limited current is used in the orientation detection process. A shorting switch, which is also a transistor, is provided for shorting out the current limiting resistor during a charging process. The shorting switch is also controlled by the CPU 432, as illustrated by the dotted arrow.

Figure 5:
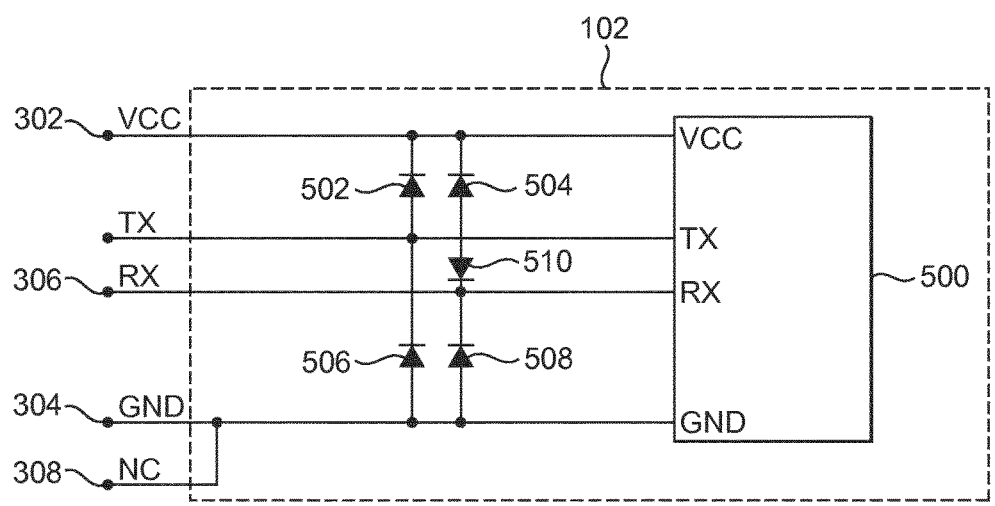
FIG. 5 is a schematic illustration of the connections between the contacts on the secondary device of FIGS. 1A and 1B.

FIG. 5 is a schematic diagram illustrating the arrangement of protection diodes in the secondary device. Protection diodes 502, 504, 506, 508 and 510 are provided between the contacts 302, 304, 306, 308, 310 in order to prevent damage to the electronics in the secondary device. These diodes allow the orientation of the secondary device relative to the primary device to be detected, as will now be described. The contacts on the secondary device are labelled Vcc for the power input contact 302, Tx for the data transmission contact 310, Rx for the data receiving contact 306, Gnd for the ground contact 304, and NC for the redundant contact 308, which is connected to ground.

In order to carry out the orientation detection process, in an initial state, all the transistors 412, 414, 416, 418, 420, 422, 424, 426, 428, 430 are off. These transistors are then switched on in pairs in order to connect two successive pins to one another. Table 1 below shows the how the pairs of transistors are switched on, where Vcc indicates the charger power supply and Gnd indicates ground. Each of these configurations is indicated by a stage reference.

It can be seen that when the Vcc contact on the secondary device is aligned with the Vcc contact on the primary device and the Gnd contact on the secondary device is aligned with the Gnd contact on the primary device, (labelled Position 1), then the voltage measured between the contacts depends upon the battery voltage of the battery within the secondary device, which could be fully or partially discharged. When the voltage reading is compared to threshold value, Position 1 could therefore give rise to a high value or a low value, and so is indicated to be undefined in Table 2. However, when the Vcc contact and Gnd on the primary device are connected to different pairs of contacts on the secondary device, the voltage across those pairs of contacts is predictable. In Position 2, the Vcc of the primary device is connected to the Gnd contact on the secondary device and the Tx contact on the secondary device is connected to the Gnd of the primary device. The voltage difference between the contacts is equal to the forward voltage of the protection diode 506, which is at most 0.8 Volts. When the CPU 432 converts this to a digital value by comparing to a threshold value it provides a low value or zero. The same is true in Position 4, where the voltage between the NC and Rx contacts on the secondary device is at most the forward voltage of protection diode 508. Conversely, in Position 3 and Position 5 the protection diodes 506 and 510 prevent the flow of current and so the voltage difference between the contacts is equal to the charger voltage Vcc. This is converted by the CPU into a high value or 1, as indicated in Table 2.

This characteristic response of the secondary device, and the ability to switch in different pairs of pins in the primary device, allows the orientation of the secondary device to be determined. Table 3 illustrates the digital signature of each position as the primary device proceeds from Stage 1 through to Stage 5. It can be seen that regardless of whether the undefined value is a 1 or a 0, each relative orientation gives rise to a unique digital signature. This allows the CPU to determine the orientation of the secondary device relative to the primary device.

TABLE 3

| Digital print | Position/Stage | Correct Stage |
|---|---|---|
| Ø0101 | P1⇒S1, P2⇒S2, P3⇒S3, P4⇒S4, P5⇒S5 | Stage 1 |
| 1Ø010 | P1⇒S2, P2⇒S3, P3⇒S4, P4⇒S5, P5⇒S1 | Stage 2 |
| 01Ø01 | P1⇒S3, P2⇒S4, P3⇒S5, P4⇒S1, P5⇒S2 | Stage 3 |
| 101Ø0 | P1⇒S4, P2⇒S5, P3⇒S1, P4⇒S2, P5⇒S3 | Stage 4 |
| 0101Ø | P1⇒S5, P2⇒S1, P3⇒S2, P4⇒S3, P5⇒S4 | Stage 5 |

Table 3 also indicates which stage is the correct stage for charging to take place. Once the orientation signature has been determined, the CPU switches the primary device to the correct stage, i.e. connects the correct pair of pins to Vcc and Gnd to allow for charging. At that stage, the CPU also switches on transistor 436 to bypass the resistor 434. Charging of the secondary device can then proceed in accordance with a particular charging protocol.

In parallel to the power transistors 412, 414, 416, 418, 420, 422, 424, 426, 428, 430, there is a network of tri-state digital gates (not shown), controlled by the CPU, to allow the Rx and Tx contacts and pins to be correctly connected together.

Figure 6:
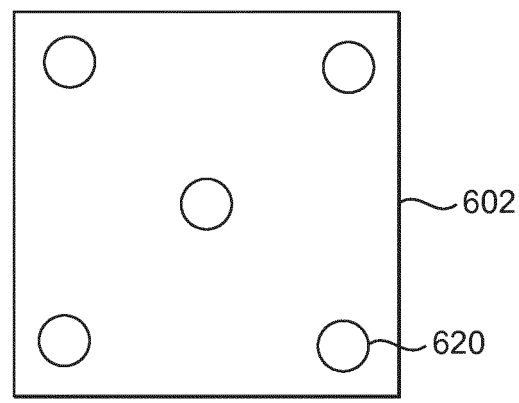
FIG. 6 is an illustration of an alternative layout of electrical contacts on the primary and secondary devices.

It should be clear that the described embodiment is just one example of many possible embodiments that could implement the invention. FIG. 6 shows an alternative shape for the housing of the secondary device and an alternative arrangement of electrical contacts. In FIG. 6 the secondary device 602 has a square cross section and the contacts 620 are arranged with a central contact and four symmetrically disposed outer contacts. With a central contact that remains central in all possible orientations there are fewer permutations to consider, and only the corresponding four outer pins on the primary device need be provided with high and low power switches.

Figure 7:
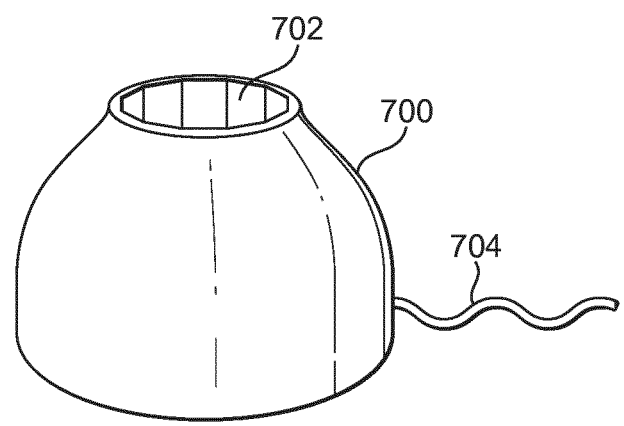
FIG. 7 illustrates an alternative primary device.

FIG. 7 illustrates an alternative primary device. The primary device 700 of FIG. 7 is a desktop USB charger, which connects via a cable 704 to a USB port on a personal computer to allow the secondary device to be charged and to exchange data with the personal computer. The USB charger 700 has a decagonal socket 702 shaped to receive the end of a secondary device of the type shown in FIG. 2.

It is of course to be understood that the specification is not intended to be restricted to the details of the above embodiments, which are described by way of example only. Although the invention has been described in relation to a electrically heated smoking system comprising a smoking device and a charging device, it should be clear that any primary and secondary devices that exchange power and data over different electrical contacts could be used to implement the invention.

The invention claimed is:

1. A primary device for connecting to a secondary device, comprising:
   at least three electrical contacts;
   a voltage source; and
   a controller,
   wherein each electrical contact of said at least three electrical contacts has an associated high switch connected between the electrical contact and the voltage source, and an associated low switch disposed between the electrical contact and electrical ground, and
   wherein the controller is connected to each of the low switches and the high switches and is configured to sequentially close a plurality of pairs of switches to connect the voltage source to the secondary device during an orientation operation, each pair of switches comprising a high switch associated with one of the electrical contacts and a low switch associated with another of the electrical contacts, and is further configured to record a voltage difference between the electrical contacts associated with each of the plurality of pairs of switches, and to determine an orientation of the secondary device relative to the primary device based on the recorded voltage differences.

2. The primary device according to claim 1, wherein the controller is further configured to close at least one low switch and at least one high switch in response to the determined orientation of the secondary device.

3. The primary device according to claim 2,
   wherein the primary device is an electrical charging device, and
   wherein the controller is further configured to close at least one low switch and at least one high switch in response to the determined orientation of the secondary device prior to a charging operation.

4. The primary device according to claim 1, wherein each of the low switches and the high switches is a transistor.

5. The primary device according to claim 1, further comprising a nonvolatile memory storing a record of expected voltage differences between the electrical contacts associated with each of the plurality of pairs of switches for each of a plurality of orientations,
   wherein the controller is further configured to compare voltage differences recorded during the orientation operation with the expected voltage differences to determine the orientation of the secondary device.

6. The primary device according to claim 1, further comprising a current limiting resistor connected in parallel with a current limiting switch between the voltage source and the at least three electrical contacts,
   wherein the controller is further configured to hold the current limiting switch open during the orientation operation.

7. The primary device according to claim 1, further comprising at least five electrical contacts.

8. An electrical system comprising a primary device and a secondary device,
   the primary device comprising:
      at least three electrical contacts,
      a voltage source, and
      a controller; and
   the secondary device comprising a plurality of electrical contacts associated with different functions and being configured to engage the electrical contacts of the primary device in a plurality of orientations,
   wherein each electrical contact of said at least three electrical contacts has an associated high switch connected between the electrical contact and the voltage source and an associated low switch disposed between the electrical contact and electrical ground, and
   wherein the low switches and the high switches are configured to sequentially close a plurality of pairs of switches to connect the voltage source to the secondary device during an orientation operation, each pair of switches comprising a high switch associated with one of the electrical contacts and a low switch associated with another of the electrical contacts, and is further configured to record a voltage difference between the electrical contacts associated with each of the plurality of pairs of switches, and to determine an orientation of the secondary device relative to the primary device based on the recorded voltage differences.

9. The electrical system according to claim 8, wherein the secondary device further comprises a diode connected between each pair of electrical contacts among the plurality of electrical contacts on the secondary device.

10. The electrical system according to claim 8, wherein the primary device and the secondary device each have at least five electrical contacts.

11. The electrical system according to claim 8, wherein the secondary device comprises a secondary battery.

12. A method of determining an orientation of a secondary device relative to a primary device to which the secondary device is connected, the primary device comprising at least three electrical contacts, a voltage source, and a controller, the secondary device having a plurality of electrical contacts associated with different functions of the secondary device and wherein the electrical contacts on the secondary device are configured to engage the electrical contacts of the primary device in a plurality of orientations, wherein each electrical contact of said at least three electrical contacts has an associated high switch connected between the electrical contact and the voltage source and an associated low switch disposed between the electrical contact and electrical ground, the method comprising:
- sequentially closing a plurality of pairs of the switches to connect the voltage source to the secondary device, each pair of the switches comprising a high switch associated with one of the electrical contacts and a low switch associated with another of the electrical contacts;
- recording a voltage difference between the electrical contacts associated with each of the plurality of pairs of switches; and
- determining the orientation of the secondary device relative to the primary device based on the recorded voltage differences.

13. The method according to claim 12,
wherein the primary device further comprises a nonvolatile memory storing a record of expected voltage differences between the electrical contacts associated with each of the plurality of pairs of the switches for each of the plurality of orientations, and
wherein the method further comprises comparing the voltage difference recorded during an orientation operation with the expected voltage differences to determine the orientation of the secondary device.

14. The method according to claim 13, wherein a digital interpretation of an expected voltage difference between the electrical contacts associated with a first pair of switches is undefined among a high value of 1 and a low value of 0.

15. A method of charging a secondary device connected to a primary device, the primary device comprising at least three electrical contacts, a voltage source, and a controller, the secondary device having a plurality of electrical contacts associated with different functions of the secondary device and wherein the electrical contacts on the secondary device are configured to engage the electrical contacts of the primary device in a plurality of orientations, wherein each electrical contact in the primary device has an associated high switch connected between the electrical contact and the voltage source and an associated low switch disposed between the electrical contact and electrical ground, the method comprising:
- determining an orientation of the secondary device relative to the primary device by:
  - sequentially closing a plurality of pairs of switches to connect the voltage source to the secondary device, each pair of the switches comprising a high switch associated with one of the electrical contacts and a low switch associated with another of the electrical contacts,
  - recording a voltage difference between the electrical contacts associated with each of the plurality of pairs of switches, and
  - determining the orientation of the secondary device relative to the primary device based on the recorded voltage differences;
- closing at least one low switch and at least one high switch in response to the determined orientation of the secondary device; and
- providing a charging current from the primary device to the secondary device through at least one of the closed switches.

* * * * *